(12) United States Patent
Huang et al.

(10) Patent No.: US 9,721,343 B2
(45) Date of Patent: *Aug. 1, 2017

(54) METHOD AND SYSTEM FOR GESTURE IDENTIFICATION BASED ON OBJECT TRACING

(71) Applicant: PIXART IMAGING INC., Hsin-Chu (TW)

(72) Inventors: Yu-Hao Huang, Hsin-Chu (TW); En-Feng Hsu, Hsin-Chu (TW)

(73) Assignee: PixArt Imaging Inc., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,777

(22) Filed: Jan. 15, 2016

(65) Prior Publication Data

US 2016/0133024 A1     May 12, 2016

Related U.S. Application Data

(63) Continuation of application No. 14/047,439, filed on Oct. 7, 2013, now Pat. No. 9,268,409.

(30) Foreign Application Priority Data

Oct. 8, 2012   (TW) .............................. 101137167 A (51) Int. Cl.
*G06F 3/033*     (2013.01)
*G06T 7/00*      (2017.01)
(Continued)

(52) U.S. Cl.
CPC ............ *G06T 7/0044* (2013.01); *G06F 3/017* (2013.01); *G06F 3/0304* (2013.01);
(Continued)

(58) Field of Classification Search
CPC ................... G06F 3/017; G06F 3/0304; G06T 2207/10016; G06T 2207/20144;
(Continued)

(56) References Cited

U.S. PATENT DOCUMENTS 7,716,008 B2 *  5/2010  Ohta ...................... A63F 13/10
                                                    702/141
7,859,519 B2 * 12/2010  Tulbert ................. G06F 3/0423
                                                    345/173
(Continued)

FOREIGN PATENT DOCUMENTS

JP            2004170873 A     6/2004

*Primary Examiner* — Amara Abdi
(74) *Attorney, Agent, or Firm* — Hauptman Ham, LLP (57) ABSTRACT

A method and system provide light to project to an operation space so that a received image from the operation space will include, if an object is in the operation space, a bright region due to the reflection of light by the object, and identify a gesture according to the variation of a barycenter position, an average brightness, or an area of the bright region in successive images, for generating a corresponding command. Only simple operation and calculation is required to detect the motion of an object moving in the X, Y, or Z axis of an image, for identifying a gesture represented by the motion of the object.

17 Claims, 11 Drawing Sheets

(51) Int. Cl.
*G06F 3/01* (2006.01)
*G06F 3/03* (2006.01)
*G06K 9/00* (2006.01)
*H04N 5/225* (2006.01)
*G06T 7/73* (2017.01)

(52) U.S. Cl.
CPC ............ *G06K 9/00335* (2013.01); *G06T 7/74* (2017.01); *H04N 5/2256* (2013.01); *G06T 2207/30196* (2013.01)

(58) Field of Classification Search
CPC ..... G06T 5/50; G06T 15/06; G09G 2320/106; G09G 2360/16; G06K 9/00355
See application file for complete search history.

(56) References Cited

U.S. PATENT DOCUMENTS

| | | | | |
|---|---|---|---|---|
| 2004/0161132 | A1* | 8/2004 | Cohen | G06T 7/2033 382/103 |
| 2005/0238202 | A1* | 10/2005 | Sato | G06K 9/00832 382/104 |
| 2009/0278799 | A1* | 11/2009 | Wilson | G06F 3/0304 345/158 |
| 2012/0268369 | A1* | 10/2012 | Kikkeri | G06F 3/038 345/157 |
| 2013/0076620 | A1* | 3/2013 | Fukano | G03B 21/14 345/156 |
| 2013/0101169 | A1* | 4/2013 | Park | G06T 7/0081 382/103 |
| 2013/0177204 | A1* | 7/2013 | Yun | G06K 9/00355 382/103 |
| 2013/0278504 | A1* | 10/2013 | Tong | G06K 9/00355 345/158 |

* cited by examiner

METHOD AND SYSTEM FOR GESTURE IDENTIFICATION BASED ON OBJECT TRACING

CROSS REFERENCE TO RELATED APPLICATIONS

This application is a Continuation of U.S. patent application Ser. No. 14/047,439, filed 7 Oct. 2013, which claims priority to Taiwan Patent Application No. 101137167, filed 8 Oct. 2012, and all the benefits accruing therefrom under 35 U.S.C. §119, the contents of which in its entirety are herein incorporated by reference.

FIELD OF THE INVENTION

The present invention is related generally to gesture detection and, more particularly, to dynamic gesture identification.

BACKGROUND OF THE INVENTION

Gesture-control systems provide simple and intuitional convenient operation. However, the systems using touch-controlled human-machine interfaces such as touch panels require users to perform operation by directly contacting the interfaces, thus being inconvenient to some applications. Contrary, the gesture-control systems using non-touch interfaces allows users to perform operation at a relatively distant place therefrom, while being more difficult to implement because such systems determine gestures by capturing and identifying images.

A well-known method for dynamic gesture identification includes receiving visible-light images, from which regions of skin color are recognized, identifying the shapes of the regions of skin color to find out the positions of a hand, and tracing the hand's displacements by detecting the variation of the hand's positions in successive images to identify the operation gesture. However, since skin-color analysis needs complex algorithm, and is highly dependent on the ambient light, it suffers from a higher error rate. Identification of the shape of a gesture also needs complex algorithm, and requires users to maintain a certain gesture shape, for example, five fingers fully separated or a V-sign made with fingers. Thus, this method is unable to identify some Operation gestures, for example, overturning a palm, opening a fist into an open palm, and making a fist from an open palm. Structural diverseness of users' hands also increases difficulty in identification or the error rate. Other disadvantages include impossible identification performed in a darker environment, and requirement of a particular starting palm pose. Due to the dependence of shape identification for tracing the displacements of a hand, such methods are effective for only the operation gestures moving in the X-axis or Y-axis of the images, while unable to identify the operation gestures moving in the Z-axis of the images, for example, a hand moving forward or backward. In some applications, for example, for mobile phones and notebook computers, where there may be objects moving at the back of the user, the resultant identification may be interfered and, in turn, misled.

In another well-known method for gesture identification based on successive images, for example, Microsoft's motion control system, Kinect, in addition to two-dimensional image analysis, a human skeleton model is further built up using the depth information of the images, and serves as a basis for tracing the variation of the hand's position to achieve gesture identification. This method requires even more complex algorithm and longer time for computing. While being applicable for detecting operation gestures moving in the Z-axis of the images, it is only effective at a constant operation distance, and gives merely a small range for users to move the gestures forward and back. In the event that the gestures are not made at the predetermined operation distance, or in the event that there is no sufficient space for the predetermined operation distance, such gesture identification systems can not be used. The rigidity in terms of operation distance gives a challenge to manufacturers of gesture identification systems. The manufacturers can only assume a reasonable operation distance, and use this assumed operation distance as a basis to design all the parameters for gesture identification. This greatly limits applications of the resultant identification systems.

The above-mentioned methods need a large number of computing operations, and thus require higher costs in both hardware and software, being not economic for some simpler applications. Also, the demanding computing operations can slow down the system response. In addition, the above-mentioned methods are not applicable to applications where only a short operation distance is given. For example, for the operation distance within 1 meter, the systems are less stable. Moreover, since the above-mentioned methods need skin-color and profile identification of the user's hand, they are not suitable for hands wearing gloves, hands with curled fingers, hands with defective fingers, and of course, objects other than human hands, for example, pens and paper rolls.

SUMMARY OF THE INVENTION

An objective of the present invention is to provide a simple method and system for gesture identification.

Another objective of the present invention is to provide a low-cost method and system for gesture identification.

Yet another objective of the present invention is to provide a method and system for gesture identification based on object tracing.

Still another objective of the present invention is to provide a method and system for gesture identification applicable for an adjustable operation distance.

A further objective of the present invention is to provide a method and system for gesture identification useful for detecting three-dimensional motions of an object.

Yet a further objective of the present invention is to provide a method and system for gesture identification widely applicable to various operation objects.

According to the present invention, a method for gesture identification based on object tracing includes the steps of projecting light to an operation space, receiving images from the operation space, detecting bright regions in the images, and identify an operation gesture according to a variation of a barycenter position, an average brightness or an area of the bright regions.

According to the present invention, a system for gesture identification based on object tracing includes a light-emitting unit projecting light to an operation space, an image sensor capturing images from the operation space, and a processor detecting bright regions in the images, performing object tracing based on information provided by the bright regions, and comparing a result of the object tracing with predetermined gesture definitions to determine an operation gesture.

BRIEF DESCRIPTION OF THE DRAWINGS

These and other objectives, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 1:
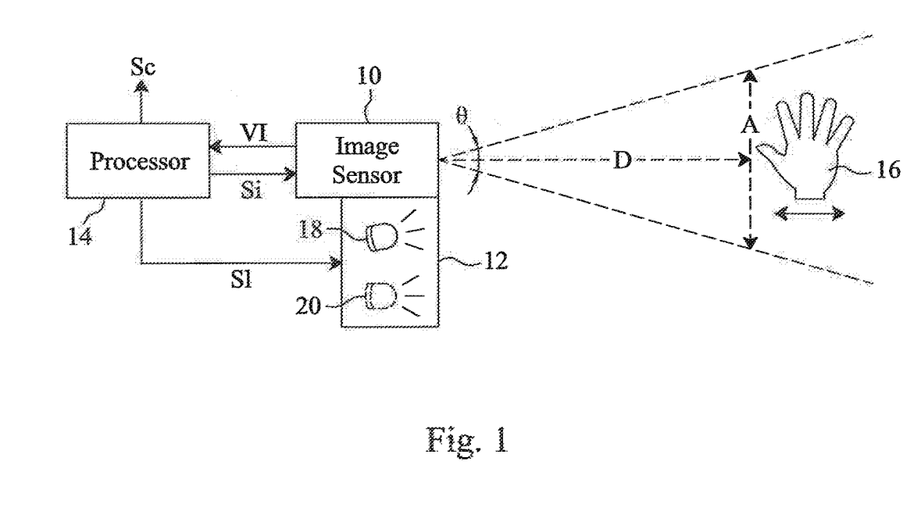
FIG. 1 is an embodiment of a system for gesture identification according to the present invention.

Referring to FIG. 1 for an embodiment according to the present invention, a system for gesture identification includes an image sensor 10, a light-emitting unit 12, and a processor 14. The image sensor 10 has a viewing angle $\theta$, which defines a viewing cone, i.e., the range Where the image sensor 10 can capture images. D represents the operation distance of an object 16, and A represents the operation space which is the cross-section of the viewing cone at the operation distance D. The processor 14 controls the image sensor 10 and the light-emitting unit 12 by using control signals Si and Sl, respectively. The light-emitting unit 12 provides visible light or invisible light that is projected to the operation space A. The image sensor 10 has a sensible wavelength range covering the wavelength of the light provided by the light-emitting unit 12. The object 16 reflects the light coming from the light-emitting unit 12, and forms a bright region in an image received by the image sensor 10. The image sensor 10 transmits the received image to the processor 14 through a video signal VI. The processor 14 uses information provided by the bright region to trace the object 16, to identify an operation gesture and generate a command Sc accordingly.

The processor 14 can switch the operation distance D by switching the viewing angle $\theta$ of the image sensor 10 or by using image processing technique. The image sensor 10 may be equipped with a prime lens or a zoom lens. For a prime lens, the viewing angle $\theta$ of the image sensor 10 is fixed. For a zoom lens, the viewing angle $\theta$ of the image sensor 10 is dynamically adjustable.

Preferably, the light-emitting unit 12 is adjustable. For example, for a longer operation distance D, the light-emitting unit 12 provides light with higher intensity. Adjustment of the light-emitting unit 12 may be achieved in many ways. In one example, for a change of the operation distance D, the operation current of the light-emitting unit 12 is modified to adjust the intensity of the light provided by the light-emitting unit 12. In another example, light sources 18 and 20 with different light-emitting angles are provided in the light-emitting unit 12, wherein the light source 18 has a larger light-emitting angle and the light source 20 has a smaller light-emitting angle. For a shorter operation distance D, the light source 18 is used, while for a longer operation distance D, the light source 20 is used. Alternatively, an optical assembly may be used to adjust the light-emitting angle of the light-emitting unit 12.

Figure 2:
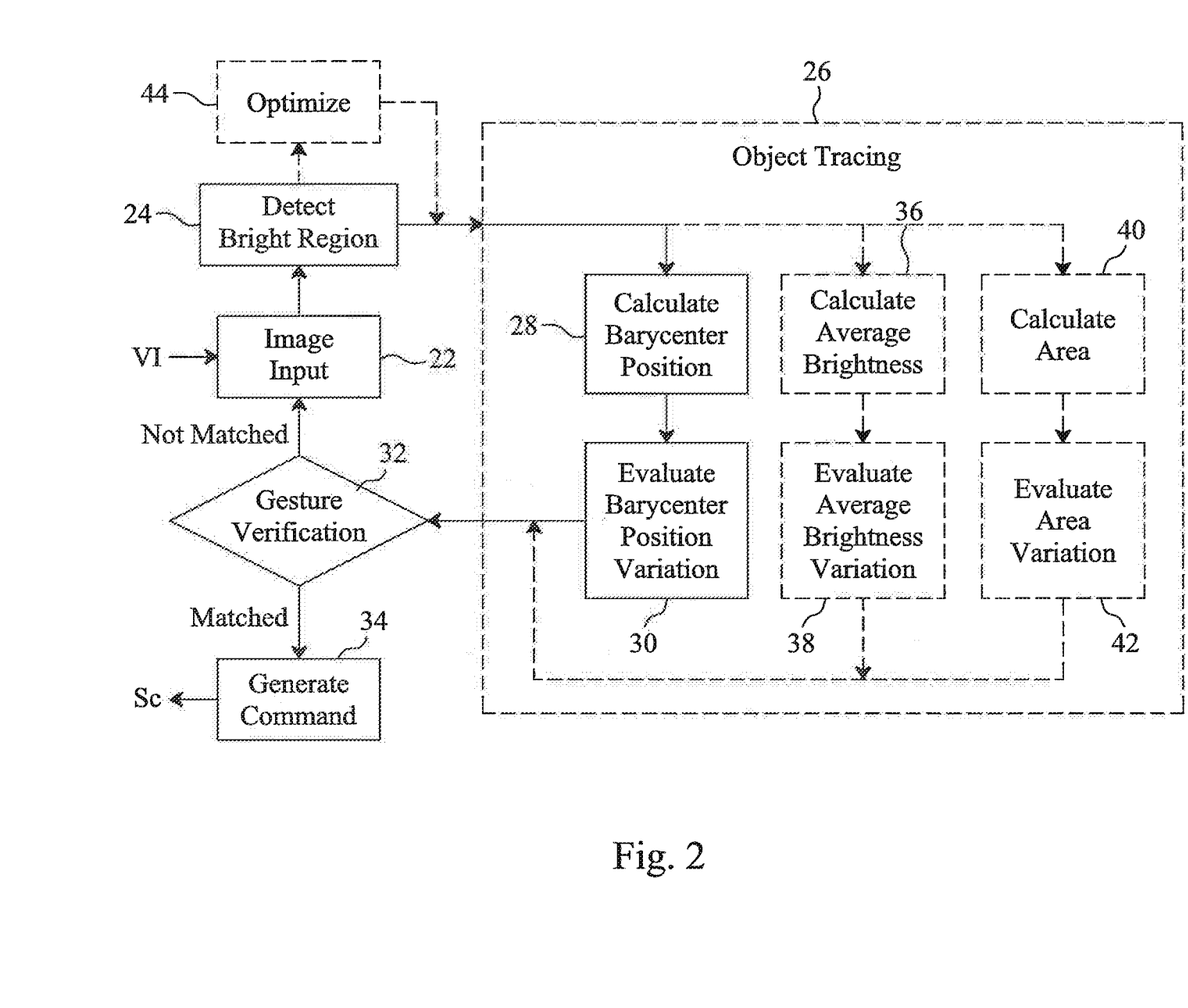
FIG. 2 is an embodiment of a method for gesture identification according to the present invention.

Referring to FIG. 2, in an embodiment of a method according to the present invention, step 22 receives an image, step 24 detects a bright region in the image, and then step 26 uses information provided by the bright region to perform object tracing. For example, step 28 calculates the barycenter position of the bright region, step 30 evaluates the variation of the barycenter position, and in step 32, the variation of the barycenter position is compared with predetermined gesture definitions. If one of the predetermined gesture definitions is matched, step 34 generates a command Sc corresponding to the relevant gesture. If the variation of the barycenter position does not match any of the predetermined gesture definitions, the process returns to step 22 to receive a next image for gesture identification.

Preferably, step 22 can perform image buffering. When the processor 14 is executing other steps, step 22 can read a next frame of image in advance, so as to speed up the overall identification process, thereby improving the response of the identification system.

In step 24, a threshold is employed as a benchmark for comparison, and only pixels having brightness greater than the threshold are considered as elements of the bright region. For example, the sensible range of intensity of the image sensor 10 is divided into thirty-two (32) levels, and the threshold is set at the eighth (18th) level. Thus, only the blocks in the image having brightness equal to or higher than the 18th level are determined as a bright region. Referring back to FIG. 1, even if there is another object behind the object 16, it will be excluded by the threshold. Preferably, the light provided by the light-emitting unit 12 is invisible, so that potential interference caused by visible light can be eliminated. Preferably, the threshold for determining a bright region is adjustable.

Figure 3:
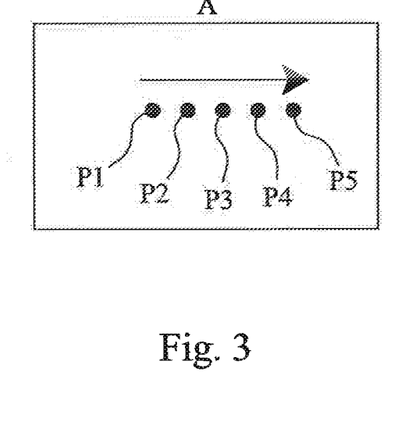
FIG. 3 illustrates gesture identification according to a variation of a barycenter position in successive images.
Figure 4:
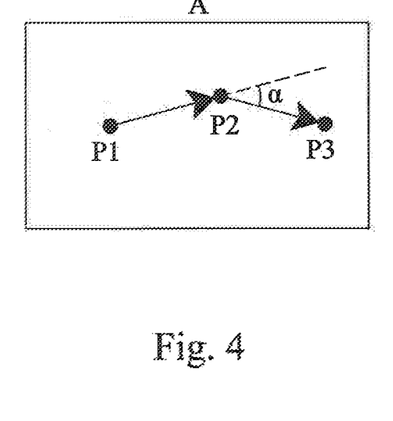
FIG. 4 illustrates gesture identification according to a variation of a barycenter position in successive images.
Figure 5:
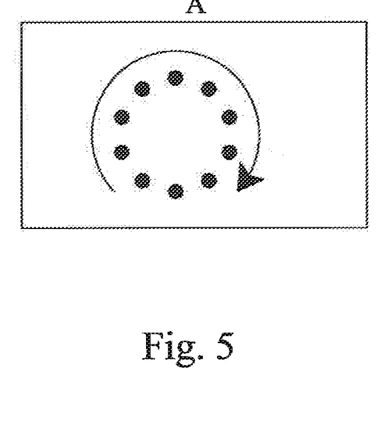
FIG. 5 illustrates gesture identification according to a variation of a barycenter position in successive images.

FIGS. 3-5 illustrate motion detection of an object 16 (e.g. a user's hand) according to a variation of a barycenter position of a bright region in successive images. In FIG. 3, as calculated, the barycenter positions P1 to P5 of the bright regions in successive images move in a certain direction, so the processor 14 determines that the user's gesture is moving in that direction. In FIG. 4, the motion vector of the barycenter positions indicates that the change of motion direction reaches an angle $\alpha$, so it is confirmed that the gesture involves changing direction. With the same principle, when the user's gesture is a rotation action, it can be identified as rotation by evaluating the barycenter positions, the motion vectors and the angel between two motion vectors, as shown in FIG. 5.

Figure 6:
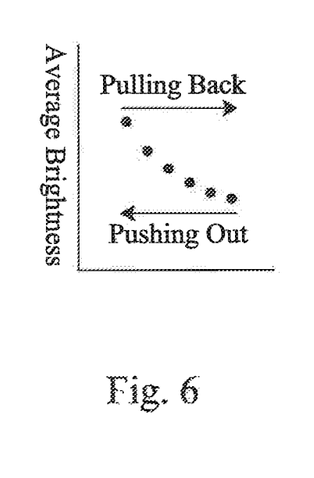
FIG. 6 illustrates gesture identification according to a variation of an average brightness in successive images.

Referring back to FIG. 2, as described previously, steps 28 and 30 involves tracing motion of an object 16 in successive images along the X axis and the Y axis of the images. For tracing motion of an object 16 in successive image along the Z axis, other information provided by the bright region may be used, for example, the variation of an average brightness or of an area of the bright region. As shown in FIG. 2, step 36 calculates the average brightness of the bright region, and step 38 evaluates the variation of the average brightness. In step 32, according to comparison between the variation of the average brightness and the predetermined gesture definitions, it decides to go to step 34 or 22. Referring to FIG. 1, the motion of an object 16 as approaching or leaving from the image sensor 10 can cause variation in the intensity of reflection, thereby causing the average brightness of the bright region to change. For example, referring to FIG. 6, the average brightness of the bright regions in successive images decreases gradually, meaning that the object 16 is leaving from the image sensor 10, so the gesture is about pulling back the object 16. On the contrary, when the average brightness of the bright regions in successive images increases gradually, it is indicated that the object 16 is approaching the image sensor 10, so the gesture is pushing out. Calculation of the average brightness of the bright region requires only simple computing operations. For example, the pixel brightness of a bright region are added together and then divided by the number of the pixels contained in the bright region. This calculation may be performed together with step 24.

Figure 7:
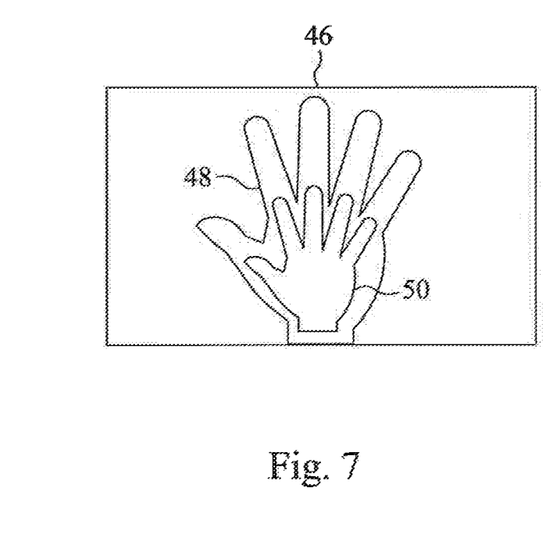
FIG. 7 illustrates a variation of the area of a bright region in successive images generated by an object moving forward and back.
Figure 8:
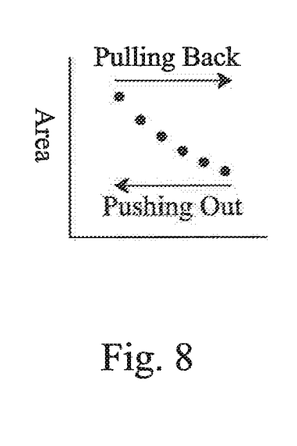
FIG. 8 illustrates gesture identification according to a variation of the area of a bright region in successive images.

Referring to FIG. 1, due to perspective, as long as the viewing angle θ remains unchanged, the size of an object 16 in an image captured by the image sensor 10 is changed with the distance between the object 16 and the image sensor 10. Thus, when the object 16 moves towards or leaves from the image sensor 10, the area of a bright region is changed. For example, referring to FIG. 7, in an image 46, a bright region 48 generated by an object 16 that is closer to the image sensor 10 is larger than a bright region 50 generated by the object 16 that is farer from the image sensor 10. Referring back to FIG. 2, step 40 calculates the area of a bright region, step 42 evaluates the variation of the area, and in step 32, according to the comparison between the variation of the area and the predetermined gesture definitions, it decides to go to step 34 or 22. For example, referring to FIG. 8, gradual decrease of the area of bright regions in successive images indicates that an object 16 is about pulling back the object 16. On the contrary, gradual increase of the area of bright regions in successive images indicates that an object 16 is about pushing the object 16 out. Since calculation of the area of a bright region can be achieved by simply calculating the pixels contained in the bright region, the computing operations are easy and can be performed together with step 24. It is appreciated that the foregoing process for motion detection of an object 16 in the Z axis of images may be performed by incorporating the results of steps 36, 38 and steps 40, 42. That is to say, the motion of an object 16 in the Z axis of successive images may be determined by consulting both the variation of the average brightness and the variation of the area of a bright region.

Reviewing back to FIG. 2, step 44 may be added after step 24 to optimize the detected result so as to improve the accuracy. For example, step 44 can use conventional opening operation, including erosion and dilation processes, to remove impurity in the images caused by noises. Alternatively, when several separate bright regions are detected in an image, step 44 only selects the brightest one and the others are all discarded. Alternatively, step 44 discards the bright region having an area outside a certain range.

Figure 9:
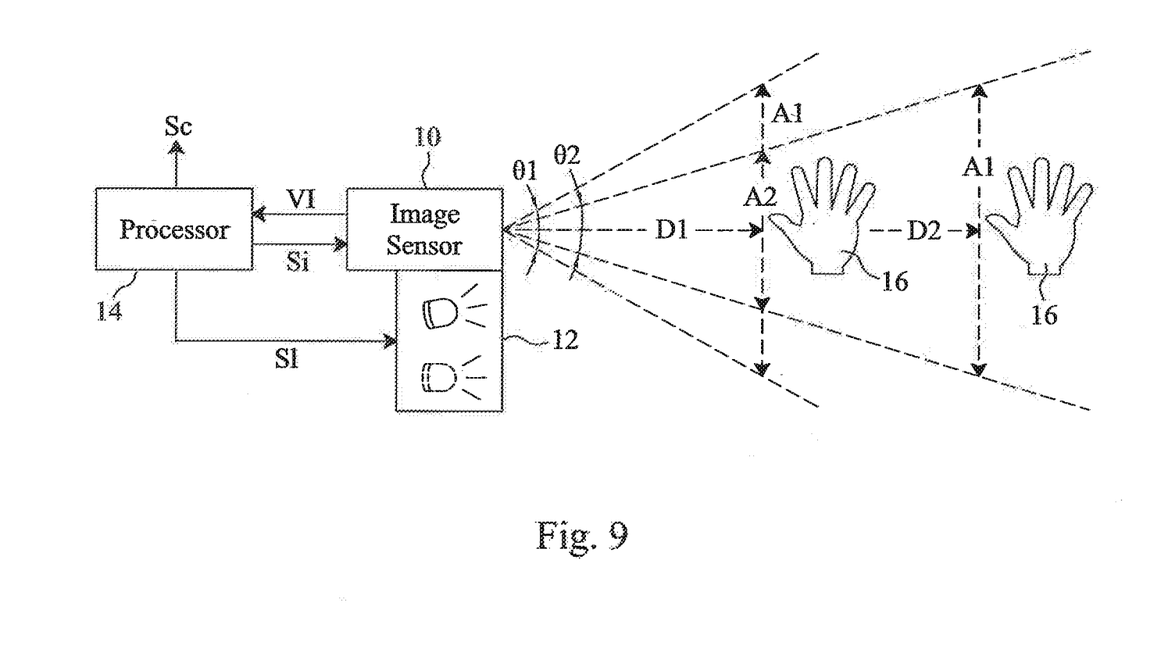
FIG. 9 illustrates the system shown in FIG. 1 switching between different operation distances.

FIG. 9 illustrates the system shown in FIG. 1 switching between different operation distances. As described previously, the operation distance D may be switched by switching the viewing angle θ of the image sensor 10, from, for example, θ1 to θ2, causing the operation distance to switch from D1 to D2 without changing the size of the operation space A1. With the same viewing angle θ2, the operation space A2 corresponding to the shorter operation distance D1 is smaller than the operation space A1 corresponding to the longer operation distance D2, so the image generated by the object 16 in the operation space A2 is larger. Particularly, according to the desired operation distance (D), the system may dynamically switch the position (D) or the size (A) that the image sensor 10 is to receive an image. Even if the viewing angle θ of the image sensor 10 is not switched, the operational distance D can be switched by using image processing technique. For example, referring to FIG. 10, in the image sensor 10, an optical sensing array 52 and a lens 54 are such configured that the viewing angle is 60°. By capturing only the central part of the image captured by the optical sensing array 52, it works as capturing an image at a longer operation distance. For example, the size of the image captured by the optical sensing array 52 is 100×100 pixels. By capturing only the central part of 50×50 pixels, it equals to capturing an image with a viewing angle of 30°. Employing this technique, even if the image sensor 10 is one using a prime lens, the operation distance D can be switched. Preferably, when the operation distance D is switched, the light-emitting unit 12 is controlled to switch its light-emitting intensity or projecting angle. Alternatively, the light sensitivity of the image sensor 10 may be adjusted by modifying the circuit gain, or the threshold of step 24 for detecting a bright region may be altered, so as to achieve the effects as those provided by switching the light-emitting intensity or projecting angle of the light-emitting unit 12.

Figure 11:
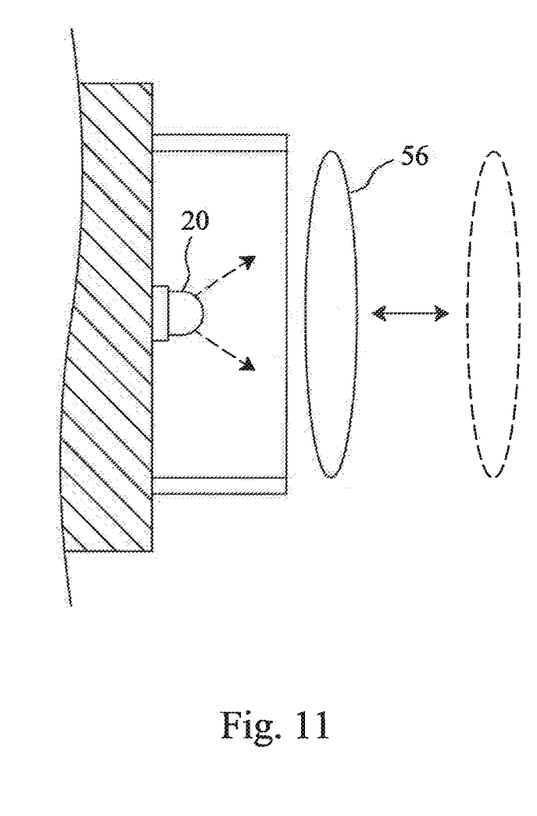
FIG. 11 shows an embodiment for adjusting a light-projecting angle by using a movable lens.
Figure 12:
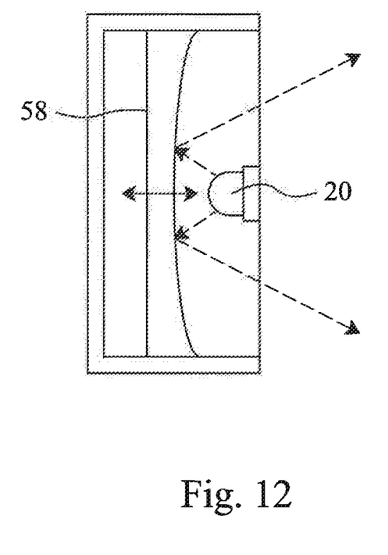
FIG. 12 shows an embodiment for adjusting a light-projecting angle by using a movable parabolic reflector.

FIG. 11 and FIG. 12 provide embodiments where optical assemblies are used to adjust the light-emitting unit 12. The two assemblies use a movable lens 56 and a Movable parabolic reflector 58 to adjust the light-projecting angle, respectively.

Figure 13:
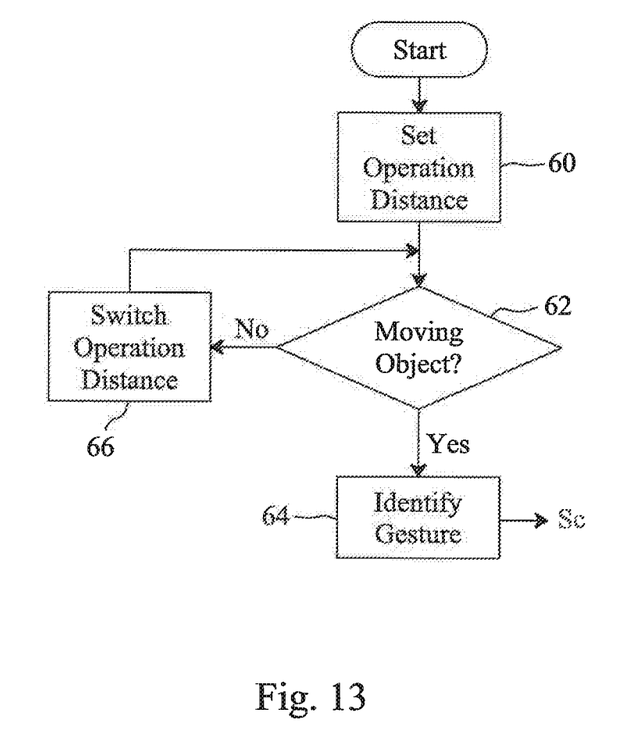
FIG. 13 is an embodiment of a method for automatically switching an operation distance.

Alternatively, the operation distance may be switched automatically by the system. For example, referring to the embodiment shown in FIG. 13, step 60 sets the operation distance D to be the default one, for example, the minimal operation distance allowed by the system. At this operation distance, step 62 detects whether any object is moving. If a moving object is detected, in step 64, gesture identification is performed to generate a command Sc; otherwise, in step 66, the operation distance D is switched, for example, increased, and then the process returns to step 62 to detect again whether any object is moving. This embodiment is useful to search an operation object, and set the system at the optimal operation distance. It is appreciated that whether it is detected a moving object depends on whether the object image satisfies a certain set of requirements about quality for object detection. The requirements about quality may include whether the brightness reaches a brightness threshold, whether the brightness variation reaches a brightness variation threshold, or whether the variation of the area of the bright region reaches an area variation threshold.

Figure 14:
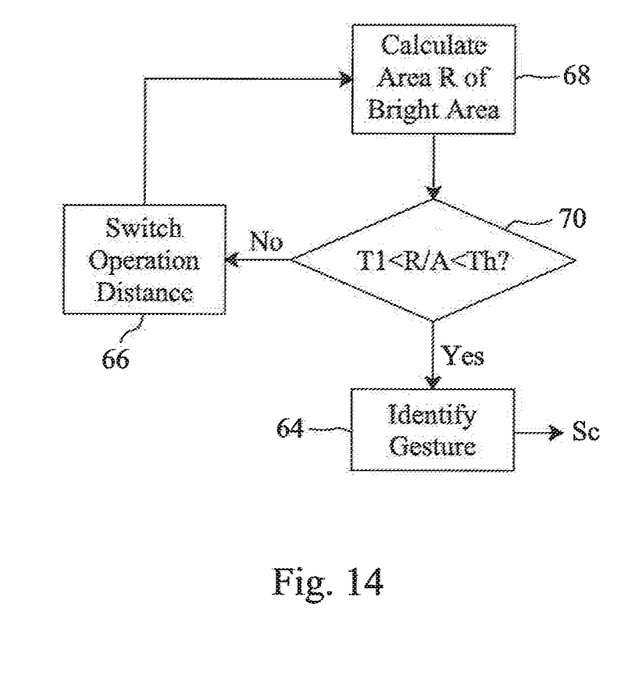
FIG. 14 is another embodiment of a method for automatically switching an operation distance.

In another embodiment, referring to FIG. 14, step 68 calculates the area R of a bright region and step 70 determines whether the area ratio R/A of the bright region in an image is between thresholds Tl and Th. If so, step 64 performs gesture identification to generate a command Sc;

otherwise, step 66 switches the operation distance and then the process returns to step 68.

Figure 10:
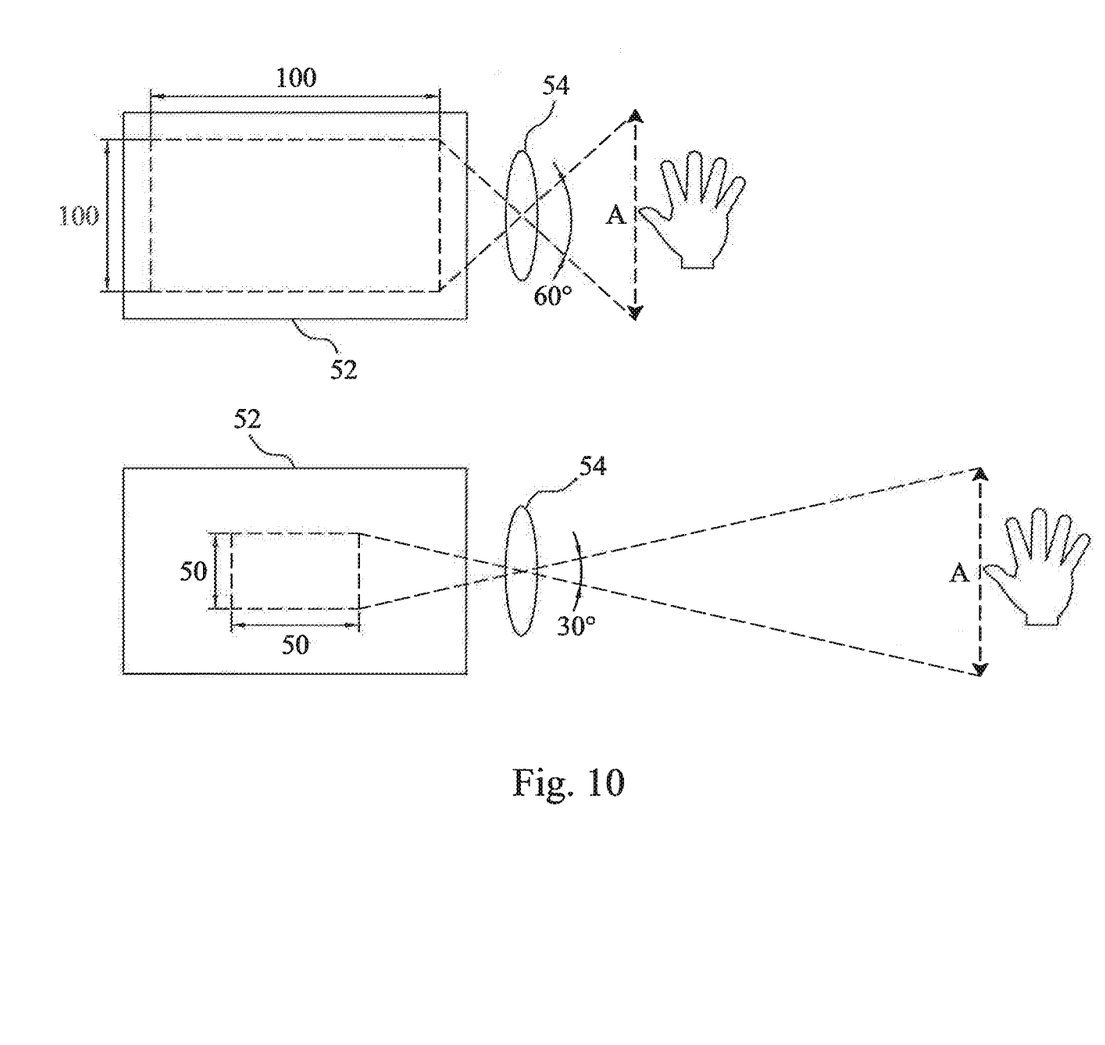
FIG. 10 illustrates an embodiment of switching an operation distance by using image processing technique.
Figure 15:
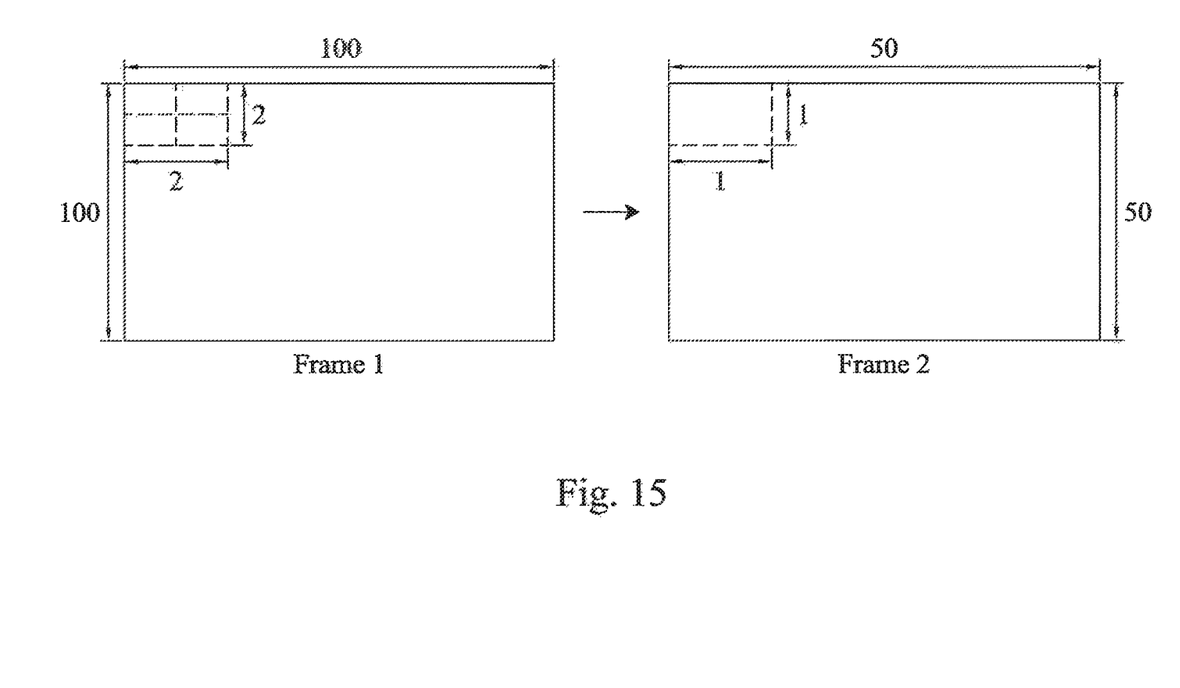
FIG. 15 illustrates downsampling of an image.

In the event that the images to be used for gesture identification are different in size due to dynamic adjustment, for example, the case shown in FIG. 10, the images may be normalized by using, for example, the known technique of scaling or downsampling, before outputted by the image sensor 10, so that the images are equalized in size before image recognition. FIG. 15 illustrates an example of downsampling, where the average brightness of each 2×2 pixels is used as a pixel brightness to downsize a Frame 1 in size of 100×100 pixels to a Frame 2 in size of 50×50 pixels.

The disclosed method for gesture identification according to the present invention does not require complex computation with depth information of images, and does not need information about the shape and skin color of the user's hand, thus being convenient to use and economic in terms of costs for hardware and software, and having improved response. In addition, since there is no need to recognize the shape or skin color of the user's hand, the operation object may be anything that reflects light projected thereon, and is not limited to human hands. Moreover, since the operation distance can be dynamically switched, a user can operate with improved, spatial freedom.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for gesture identification based on object tracing, the method comprising:
   projecting light to an operation space;
   capturing, by an image sensor, images from the operation space to generate a plurality of successive images;
   detecting a bright region in each of the successive images, wherein a sensible range of pixel intensity of said each image is divided into predetermined levels and pixels having brightness greater than an intensity threshold among the predetermined levels are determined as the bright region;
   performing object tracing based on a variation of a barycenter position of the bright region without recognizing a shape of the bright region; and
   comparing a result of the object tracing based on the variation of the barycenter position with predetermined gesture definitions to identify an operation gesture in an X axis and a Y axis.

2. The method of claim 1, further comprising:
   normalizing a size of the successive images.

3. The method of claim 1, further comprising:
   calculating an average brightness of the bright region by calculating a sum of the brightness of pixels contained in the bright region and dividing the sum by a number of the pixels contained in the bright region; and
   evaluating a variation of the average brightness to identify an operation gesture in a Z axis.

4. The method of claim 1, further comprising:
   calculating an area of the bright region by calculating a number of pixels contained in the bright region; and
   evaluating a variation of the area to identify an operation gesture in a Z axis.

5. The method of claim 1, further comprising:
   switching intensity of the light projected to the operation space.

6. The method of claim 1, further comprising:
   switching a projecting angle of the light projected to the operation space.

7. The method of claim 1, further comprising:
   switching an operation distance between the operation space and the image sensor.

8. The method of claim 1, further comprising:
   capturing a part of one of the successive images to achieve an effect as of switching an operation distance between the operation space and the image sensor.

9. A system for gesture identification based on object tracing, the system comprising:
   a controlled light-emitting unit configured to project light to an operation space;
   an image sensor configured to capture images from the operation space to generate a plurality of successive images; and
   a processor connected to the light-emitting unit and the image sensor, wherein the processor is configured to
      receive the successive images from the image sensor,
      detect a bright region in each of the successive images, wherein a sensible range of pixel intensity of said each image is divided into predetermined levels and pixels having brightness greater than an intensity threshold among the predetermined levels are determined as the bright region,
      perform object tracing based on a variation of a barycenter position of the bright region without recognizing a shape of the bright region, and
      compare a result of the object tracing based on the variation of the barycenter position with predetermined gesture definitions to identify an operation gesture in an X axis and a Y axis.

10. The system of claim 9, wherein the image sensor is configured to normalize a size of the successive images.

11. The system of claim 9, wherein the processor is further configured to
   calculate an average brightness of the bright region by calculating a sum of the brightness of pixels contained in the bright region and dividing the sum by a number of the pixels contained in the bright region, and
   evaluate a variation of the average brightness to identify an operation gesture in a Z axis.

12. The system of claim 9, wherein the processor is further configured to
   calculate an area of the bright region by calculating a number of pixels contained in the bright region, and
   evaluate a variation of the area to identify an operation gesture in a Z axis.

13. The system of claim 9, wherein the processor is configured to control the image sensor to switch a viewing angle of the image sensor.

14. The system of claim 9, wherein the processor is configured to control the image sensor to switch a light sensitivity of the image sensor.

15. The system of claim 9, wherein the processor is configured to control the light-emitting unit to switch intensity of the light to be projected to the operation space.

16. The system of claim 9, wherein the processor is configured to control the light-emitting unit to switch a light-emitting angle of the light-emitting unit.

17. The system of claim 9, wherein the processor is configured to identify the operation gesture based on the variation of the barycenter position in the successive images without computing depth information of the successive images.

* * * * *